Jan. 14, 1958

R. L. HUGHES 2,820,215

AUTOMOBILE ALARM SYSTEM

Filed Oct. 15, 1956

Ralph L. Hughes
INVENTOR.

and Patent Office
2,820,215
Patented Jan. 14, 1958

2,820,215
AUTOMOBILE ALARM SYSTEM
Ralph Lewton Hughes, Los Angeles, Calif.

Application October 15, 1956, Serial No. 615,984

8 Claims. (Cl. 340—54)

This invention relates to automatic alarm systems for motor vehicles and has for its purpose to sound an alarm and flash a blinking warning light to remind a motor vehicle operator to turn on the vehicle's headlights before driving at night. A further object of this invention is to sound the alarm and flash the warning light in case the motor vehicle is parked with its headlights left burning which might cause the motor vehicle's battery to become discharged to such an extent that it could not start the vehicle's motor again when desired.

There is a great need for such a device to warn a motorist and remind him to turn on his headlights before driving on a city's streets or lighted highways at night. In many instances there is enough light from the street lights so that the motorist does not recognize the fact that he has started driving without his headlights being turned on. There are hundreds of just such cases in every large city each evening and motor vehicles operating on city streets at night without their headlights being turned on have caused thousands of accidents and many deaths each year in America. Thousands of dollars are paid out in fines paid for traffic law violations due to traffic citations for driving after dark without the vehicle's headlights burning. Also, few things in life are more aggravating than to find that your parked car will not start due to the headlights having been left burning when the car was parked, thus discharging the car's battery and making it useless.

According to the invention whenever either, but not both, the ignition switch or the headlight switch is closed and its electrical circuit energized by the motor vehicle's electrical battery, a special type electrical relay closes electrical switch contacts, thus energizing and operating a warning light and sounding an alarm buzzer or bell warning the motor vehicle operator that the motor vehicle's headlights should be turned either on or off.

The invention also includes means for automatically stopping the alarm and warning light when the vehicle's headlights are manually turned either "on" as desired for driving at night or "off" as desired for leaving the vehicle parked either day or night.

The invention further comprises means for stopping the alarm and warning light whenever it is desired to operate the motor vehicle without its headlights being turned "on"—as in the daytime, for example, or whenever it is desired to have the motor vehicle's headlights burning even though the vehicle is not being operated otherwise.

The invention further comprises means for automatically re-setting the alarm operating relay so that it will again operate in the event the alarm has been stopped manually and either the headlights or ignition switches have later been turned "on" or "off," thus making this alarm system fully automatic in its operation and use.

Further features of this invention and further objects to be attained will be described in the following specification. It is to be understood that the invention resides mainly in the alarm system, as described and shown in the specification and drawings, and as claimed: the description of one modification of this system is not intended to be limitive but to show by way of example how the system can be carried into effect. Many changes especially with regard to specific details mentioned may, therefore, be made without departing from the essence of the invention.

More specific objects and features of this invention will become apparent from the following description when considered in connection with the accompanying drawings, in which—

Figure 1:
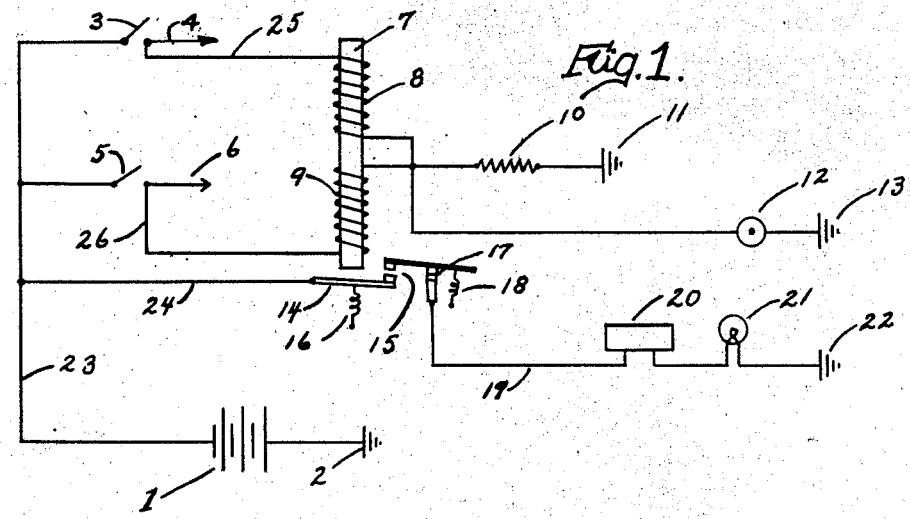
Figure 1 is a drawing of the electrical connection of an automatic alarm system producing both a visual and an audio alarm.

According to the modification shown in the diagram, Figure 1, the installation comprises both a visual alarm indication as indicated by a warning lamp 21 and also an audio alarm, of the bell, buzzer or chime type, as indicated by an alarm buzzer 20.

The alarm is given by means of the usual automobile ignition switch 3 or the headlight switch 5 being closed manually. The closing of the automobile ignition switch will, of course, energize the ignition system through conductor 4 of the automobile allowing the car engine to be started by the starting motor which is powered by the electrical battery 1 of the motor vehicle. The closing of the ignition switch 3 also energizes a closing coil 8 of an alarm relay 7, through a resistor 10 and ground connections 11 and 2 and the battery 1. This closes relay contacts 15, of relay 7, which energizes an alarm buzzer 20 and warning lamp 21 through the automobile battery 1 causing buzzer to sound an alarm and the lamp to light up. The lamp 21 may be a flashing lamp of the usual kind made with a filament wire that opens due to heat causing the metal filament wire to expand and bend away from its normally closed position. This will cause the lamp 21 to continue to flash or blink momentarily "on" and "off," and also cause the buzzer 20 to buzz "on" and "off" with the flashing of the lamp 21 since it is in electrical series with the lamp 21, whenever it is in operation by the closing of the relay switch contacts 15.

The relay 7 also has another coil winding 9 which is connected to the headlight switch 5 of the vehicle's electrical system. This relay coil winding 9 is also wound around the relay core 7 in such a way that an electrical current of equal value from the battery 1 and headlight switch 5 will flow in a reversed direction from the current flowing through coil 8 so as to cause a magnetic field of a reversed and opposite polarity from the magnetic field produced by the coil 8. Thus when both switches 3 and 5 are in a closed position the magnetic field produced by coil 9 will cancel or neutralize the magnetic field of coil 8, thus rendering the relay inoperative and opening the relay switch contacts 15 by action of spring 16.

A normally open push-button switch 12, in series with coils 8 and 9, is provided in electrical parallel connection with a resistor 10. The momentary closing of this push-button switch 12 shorts-out or by-passes the resistor 10 and permits an increased amount of electric current to flow through either or both relay coils 8 or 9 depending upon the open or closed position of switches 3 and 5.

When both ignition and headlight switches 3 and 5 are in a closed position the coils 8 and 9 neutralize the magnetic field of the relay core 7 and relay contacts 15 are in their normally open position regardless of whether the push-button switch 12 is in an open or closed position. However, when only the ignition switch 3, or only the headlight switch 5, is in the closed position causing relay switch contacts 15 to be closed, then the closing manually of the push-button switch 12 increases the electricity and magnetism of the relay coil 8 or coil 9 and pulls the relay armature 14 the full distance so as to make contact with the relay core 7. This action causes the second pair of relay switch contacts 17, which are normally in a closed position, to be opened which opens the electrical circuit to the alarm buzzer 20 and lamp 21 causing the buzzer 20 to be silent and the lamp 21 to go out.

The push-button switch 12 is, of course, only closed momentarily and is self-opening, causing the electrical current to again flow through the relay coil 8 or 9 and the resistor 10 the same as before the push-button switch 12 was momentarily closed. Normally this produces a magnetic field too weak to pull the relay armature 14 to the fully operative position in contact with the relay core 7. However, the magnetic field is strong enough to hold the relay armature 14 in this position once it has made contact with the relay core 7 since there is now no air-gap between the relay core 7 and the armature 14 and so a stronger attraction now exists between the two. Thus the momentary closing of the push-button switch 12 causes the relay armature 14 to close and hold in this fully operative position in contact with the relay core 7. This action causes the normally closed relay switch contacts 17 to be opened and remain in this open position as long as either, but not both, of the relay coils 8 or 9 is energized by either switch 3 or 5 being in the close position. This, therefore, shuts-off the alarm buzzer 20 and lamp 21 until the headlight or ignition switch 3 or 5 is again opened or closed manually. The relay switch contacts 15 are normally held in the open position by the spring 16 which pulls the relay armature 14 away from relay core 7. The relay switch contacts 17 are normally held in the closed position by action of spring 18.

Figure 2:
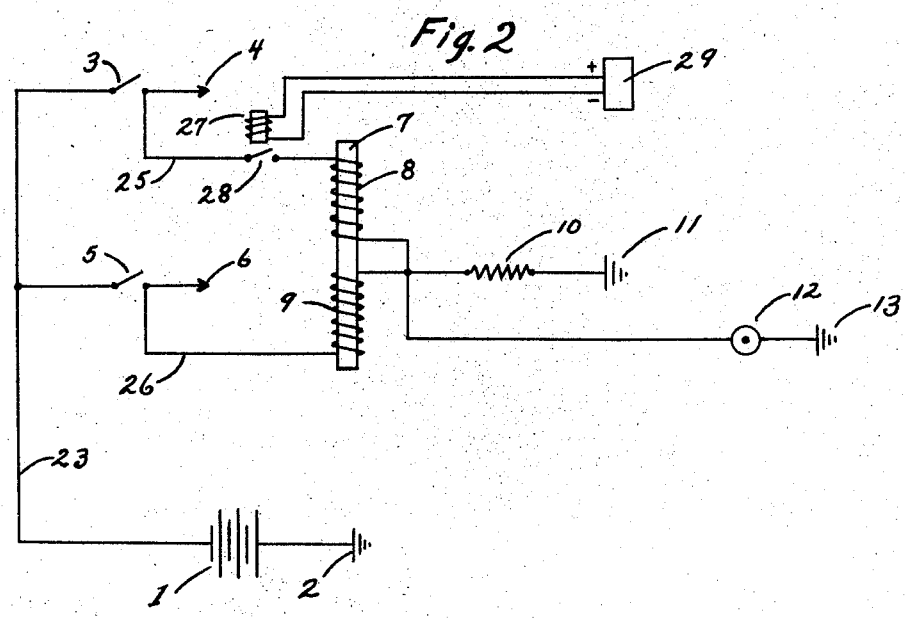
Figure 2 is a partial view of the diagram shown in Figure 1, but with the addition of a light-controlled relay with its switch contacts inserted in electrical series with the ignition switch relay coil as may be used in this invention.

A light operated relay 27, Figure 2, may be used with its switch contacts 28 inserted in electrical series connection between the ignition switch 3 and the relay coil 8 so that light falling upon a photovoltaic cell or sun battery 29, connected in series with the coil of relay 27, will cause the relay 27 to open its normally closed switch contacts 28. This will open the circuit to the relay coil 8 during daylight hours and prevent the alarm buzzer 20 and lamp 21 from operating in the daytime when the motor vehicle is operating without its headlights burning.

The operation of the alarm system is as follows: Assuming that a motor vehicle operator is about to operate his vehicle and turns the ignition switch 3 to the closed position before starting his motor. Then it will be seen that an electrical current will flow from the automobile battery 1 through conductor 23 and switch 3 to the ignition system through the conductor 4. An electrical current will also flow from the ignition switch 3 through conductor 25 and relay coil 8 and resistor 10 through the grounded connections 11 and 2 to the opposite terminal of the battery 1. This produces a magnetic field in coil 8 and relay core 7, creating a pulling action on the relay armature 14 against the tension of spring 16 and causes switch contacts 15 to close. When relay switch contacts 15 close they energize the alarm circuit allowing an electrical current to flow from battery 1 through conductors 23 and 24, armature 14, relay switch contacts 15 and 17, conductor 19 through alarm buzzer 20 and warning lamp 21, through grounded connections 22 and 2 and back to battery 1. This causes the buzzer 20 to sound an alarm and the lamp 21 to produce a flashing light which reminds the motor vehicle operator to turn his headlights on before driving the vehicle. If it is at night and the headlights are needed the operator will then close the headlight switch 5—thus turning his headlights "on."

When the headlight switch 5 is thus closed and the ignition switch 3 remains closed so the motor will run an electrical current will flow from the battery 1 through conductor 23 and switch 5 to the headlight circuit 6 and light the headlights. A current will also flow from battery 1, through conductor 23, switch 5, conductor 26, relay coil 9, resistor 10 and back to the battery 1 through grounded connections 11 and 2. This produces a magnetic field in relay coil 9 of equal magnitude and opposite polarity as that produced by coil 8 and neutralizes the magnetic action of relay 7. This allows spring 16 to open relay switch contacts 15 and hold them open until only one of the coils 8 or 9 is again energized. The opening of switch contacts 15 stops the electrical current flow through buzzer 20 and lamp 21 thus stopping the buzzer 20 and turning off the warning lamp 21 since the motor and headlights are both "on" and no alarm is now needed.

If the ignition switch 3 was closed to operate the motor vehicle during daylight and it was not desired to have the headlights burning all the driver needs to do is to shut off the alarm buzzer 20 and lamp 21 is to momentarily close the push-button switch 12. The closing of this push-button switch 12 completes the electrical circuit from the battery 1 through conductor 23, ignition switch 3, conductor 25, coil 8, push-button switch 12 and back to battery 1 through grounded connections to automobile frame at 13 and 2. This electrical circuit shorts-out or by-passes the resistor 10 and allows a larger electrical current to flow through coil 8 which produces a greater magnetic field in relay core 7 and pulls the relay armature 14 all the way so as to make contact with the relay core 7 and forces open the relay switch contacts 17 against the pull of spring 18.

When the relay contacts 17 are thus opened the electrical circuit from the battery 1 to buzzer 20 and lamp 21 is opened and the alarm buzzer 20 and warning lamp 21 are shut off.

Since the push-button switch 12 is self-opening after being momentarily closed manually the electrical current through the ignition switch 3 and relay coil 8 again flows through resistor 10 and is again reduced in magnitude to the same quantity as before the push-button switch 12 was closed. However, since the relay armature 14 is now in physical contact with the relay core 7 there is still a great enough magnetic attraction present to hold the armature 14 in this fully operated position and thus hold the relay switch contacts 17 in their open position which continues to keep the electrical circuit open from the battery 1 to the alarm buzzer 20 and warning lamp 21. This keeps the alarm buzzer 20 and lamp 21 in an inoperative or "off" condition until the relay core 7 is again demagnetized by the ignition switch 3 being opened when the vehicle's motor is turned off, or by the headlight switch 5 being turned "on," causing an electrical current flowing from battery 1 through switch 5 and relay coil 9 to neutralize or cancel the magnetic field produced by coil 8 and thus allowing the relay armature to be returned to its re-set or normal de-energized position with relay contacts 15 open and contacts 17 closed.

The operation of this alarm system for preventing the driver from leaving the automobile parked with its headlights burning is very similar to that just described. In this case the ignition switch 3 and headlight switch 5 are both in a closed position while driving the vehicle at night. In this condition both relay coils 8 and 9 are magnetizing the core 7 in an opposite polarity so as to neutralize the relay core 7 and causing relay switch contacts 15 to remain in an open position. This prevents the alarm buzzer 20 and lamp 21 from operating while the vehicle is being driven at night with its headlights turned "on," which is the normal condition desired.

Then when the vehicle is parked and the ignition switch 3 is turned to the open position to stop the motor the neutralizing effect of the relay coil 8 is ended and the magnetic field of the coil 9 again magnetizes the relay core 7 with a strong enough magnetic attraction to pull the relay armature 14 far enough to close the relay switch contacts 15. This action causes the electrical current from the battery 1 to flow through conductors 23 and 24, relay switch contacts 15 and 17, buzzer 20, lamp 21 and back to the battery 1 again through grounded connections 22 and 2. This sounds the alarm buzzer 20 and flashes the warning lamp 21, reminding the driver to turn off the headlight switch 5 before leaving the parked vehicle.

When the headlights are then turned "off" by opening switch 5 the coil 9 is then de-energized and core 7 is demagnetized, thus allowing the relay switch contacts 15 to again re-set to their normally open position and thus opening the circuit to the buzzer 20 and the lamp 21, stopping the alarm buzzer 20 and flashing lamp 21.

If, for some reason, the vehicle was being driven in the daylight with its headlights turned "on," as often happens because of driving in the early morning or in a heavy fog and continuing to drive during clear daylight conditions, and the alarm having been turned off by the pressing of push-button switch 12, then it is very often the case that the vehicle will be parked with its headlights left burning. This alarm system will, however, sound the alarm 20 and flash the warning lamp 21 as soon as the ignition switch 3 is turned off—with the headlights left "on"—and will thus remind the driver that the headlights should be turned off before leaving the vehicle.

As shown in Figure 2 a light controlled relay 27 may be used with its switch contacts 28 connected in electrical series between the ignition switch 3 and relay coil 8. The coil winding of relay 27 is connected in series with a light operated photo-voltaic cell 29 which generates a small electrical voltage whenever light rays fall upon it as is commonly known by anyone familiar with the art. The relay switch contacts 28 are normally held in their closed position, but when a sufficient amount of light, such as normal daylight, falls upon the photo-voltaic cell 29 an electrical voltage is self-generated within the cell 29 to cause an electrical current to flow through the coil winding of relay 27 sufficient to cause the relay switch contacts 28 to open. This action prevents any electrical current from flowing through the relay coil 8, Figures 1 and 2, when the ignition switch 3 is closed.

One purpose of the relay 27 is to prevent the relay coil 8 from causing the alarm system to operate when the ignition switch 3 is closed and the motor vehicle is operated in daylight hours without the headlights being turned on. In this case it merely eliminates the need to press the push-button switch 12 to stop the alarm.

A further purpose of this relay 27 is to sound the alarm 20 and flash the lamp 21 whenever the vehicle is being operated without its headlights being "on" during daylight hours and darkness falls to such an extent to cause the need for the headlights to be turned "on." When this happens the electrical current generated in the photo-voltaic cell or sun battery 29 falls to such a low value that relay coil 27 allows relay switch contacts 28 to close, thus completing the electrical circuit to relay coil 8 and closing relay contacts 15 which operates the alarm buzzer 20 and lamp 21, reminding the driver to turn the headlights "on." When the headlight switch 5 is then closed the relay coil 9 is then energized which neutralizes the magnetism of relay core 7 and shuts off alarm 20 and lamp 21.

This light-operated relay 27 will also remind the driver to turn off the headlights when driving in early morning hours and darkness turns to daylight. This causes relay contacts 28 to be opened by relay 27 leaving relay coil 9 in control of relay 7 and closes contacts 15 which causes operation of alarm buzzer 20 and lamp 21. When the driver then turns off the headlights by opening switch 5 both relay coils 8 and 9 are de-energized and contacts 15 are again opened which shuts off the alarms.

If the driver wished to continue with the headlights "on" during daylight hours the momentary pressing of the push-button switch 12 will, of course, cause the relay coil 9 to pull the armature 14 to the fully operated position and open the relay switch contacts 17 shutting off the alarm 20 and lamp 21.

Having thus described my invention, I claim:

1. An alarm system for motor vehicles having an alarm circuit with an alarm relay provided with an armature and switch contacts, and further provided with two closing coils, one coil connected to the motor vehicle's electrical battery through the ignition switch, the other coil being connected to said battery through the headlight switch of the motor vehicle, each coil so connected to the alarm circuit to produce a magnetic field of equal value and of opposite polarity, the remaining terminals of both said relay coils connected to the battery return circuit through a common resistor and grounded vehicle frame connections, a self-opening push-button switch connected in electrical parallel with said resistor, one pair of relay switch contacts operated by said alarm relay armature to a closed position when an electrical current flows through said relay coil and resistor, a second pair of relay switch contacts in normally closed position operated by said relay armature to an open position when the said push-button switch is temporarily closed to short circuit the said resistor and hold the said second pair of relay switch contacts in their open position after the push-button switch is self-opened, due to increased magnetic attraction of relay core and armature upon physical contact with each other, an alarm sounding buzzer and a warning lamp in electrical series with each other connected to the motor vehicle's electrical battery through an additional electrical alarm circuit containing both said pairs of relay switch contacts connected in electrical series with said alarm buzzer, warning lamp and electrical battery.

2. An alarm system for motor vehicles having an electrically operated audible alarm and warning lamp connected to the motor vehicle electrical battery through two pair of relay switch contacts, one pair of said relay switch contacts normally held in their open position the other pair of said relay switch contacts normally held in their closed position and connected in electrical series with the first said pair of contacts, both said pair of alarm relay switch contacts operated by an alarm relay armature and a core having a pair of relay closing coils so wound and connected together that an electrical current from the motor vehicle electrical battery flowing through both of said coils will produce magnetic fields of equal value and of opposite polarity to one another, one of said relay coils connected to the vehicle battery through the vehicle ignition switch, the other said alarm relay coil connected to said battery through the vehicle headlight switch, the remaining terminal of each said relay coil connected through a resistor to the grounded frame and grounded battery return connections, a temporarily closing push-button switch connected in electrical parallel with the said resistor in the alarm relay coils return circuit to the said battery, the said resistor being of sufficient value of electrical resistance that an electrical current flowing from said battery through either one of the said alarm relay coils and through the said resistor will cause the normally open relay switch contacts to close and complete the audible alarm and lamp circuit to give the alarm, the said push-button switch, when operated manually, by-passes the resistor electrically permitting an increased amount of current to flow through the said alarm relay coil and, due to an increased magnetic attraction causes said alarm relay armature to open the normally closed second said pair of relay switch contacts, shutting off the alarm and causing said relay armature to make physical contact with said relay core and retaining this said physical contact after push-button switch is released, due to an electrical current flowing again through the said relay closing coil and said resistor and holding said second pair of said relay switch contacts in their open position thereby rendering the alarm inoperative until either the vehicle ignition switch or headlight switch is again opened or closed manually, the entire alarm system being connected to the motor vehicle electrical system to sound an alarm and light a warning lamp whenever either one, but not both, the ignition switch or the headlight switch is in the closed position, to prevent the vehicle being driven at night without its headlights being turned on and also to prevent the vehicle from being left in a parked condition with the motor turned off and the headlights left burning.

3. An alarm system for motor vehicles composed of an electrically operated alarm bell and warning lamp so connected to the electrical system of the motor vehicle that it will sound an audible alarm and light a warning lamp whenever the motor of the vehicle is operated without the headlights being turned on, and whenever the motor is turned off and the headlights are left on, one pair of normally open relay switch contacts and one pair of normally closed relay switch contacts connected in electrical series connection with the said alarm bell and warning lamp and the electrical battery circuit of the vehicle, an alarm relay with an operating armature and two closing coils, one of said relay closing coils being connected to the said battery through the ignition switch of the motor vehicle and energized whenever the said ignition switch is in a closed position, the other said relay closing coil connected to the battery through the vehicle headlight switch and energized when the headlight switch is in a closed position, both said relay closing coils connected to the said battery return circuit through a resistor and suitable battery connections, a self-opening push-button switch connected in electrical parallel with the said resistor, to by-pass the said resistor when desired to shut-off the alarm system without operating the said ignition or headlight switches, each of said alarm relay closing coils, when energized, producing an electromagnetic field of equal value and opposite polarity to one another and when energized separately with an electrical current flowing through said relay closing coil and resistor, operates to close the pair of said normally open relay switch contacts to sound the alarm and light the warning lamp, and when said relay closing coils are energized separately with the said push-button switch closed temporarily to by-pass the resistor and permit a larger electrical current to flow through the said relay coil operates to open the second pair of said normally closed relay switch contacts and hold said second pair of switch contacts open after the self-opening of said push-button switch to shut off the alarm bell and warning lamp when desired without manually operating either of said ignition and headlight switches.

4. An alarm system for motor vehicles comprising an electrically operated audio alarm and a visual warning lamp, means for connecting this alarm system to the electrical battery circuit of the motor vehicle through two pairs of relay switch contacts, the first of said pairs of relay switch contacts normally being held in an open position, the second of said pair of relay switch contacts being normally held in their closed position, a pair of alarm relay closing coils wound upon a relay core to produce, when energized, two magnetic fields of equal strength and of opposite polarity, a relay armature controlled by said relay coils and core that operates the said two pairs of relay switch contacts, one of said pair of relay closing coils connected to the said electrical battery through the ignition switch of the motor vehicle, the second of said pair of relay closing coils connected to said battery through the motor vehicle headlight switch, the other end of both said relay closing coils connected together and also connected to the return circuit of said battery through a resistor and suitable grounded connections to the vehicle frame, a self-opening push-button switch which, when in a momentarily closed position, by-passes electrical current around the said resistor and allows a larger current to flow through the said relay closing coils producing a stronger magnetic field in said relay closing coils, either of said relay closing coils when properly energized through either of appropriate said ignition or headlight switch operating, when electrical current flows through the said coil and said resistor, to close and hold closed the said pair of normally open relay switch contact switches of the audio alarm and visual warning lamp to prevent the motor vehicle driver from driving the said vehicle at night without its headlights turned on, and to further prevent the driver from leaving the vehicle in a parked condition with its motor turned off and its headlights left on, said relay closing coils to operate, when the said push-button switch is held momentarily in its closed position, to open and hold open the second pair of relay switch contacts to effectively shut-off the said audio alarm and visual warning lamp when the vehicle driver desires to operate the vehicle without the headlights being turned on or to leave the vehicle in a parked condition with the headlights left burning and the motor shut off, said relay closing coils to further operate, whenever both the said vehicle headlights and ignition switches are in a closed condition, to neutralize the magnetic attraction of said relay core and allow both of said pair of relay switch contacts to return to their normal positions, thus effectively shutting-off the entire alarm system when operating conditions are again normal.

5. An alarm system for motor vehicles having an alarm circuit with an alarm relay provided with an armature and switch contacts, and further provided with two closing coils, one coil connected to the motor vehicle electrical battery through the ignition switch, the other coil being connected to said battery through the headlight switch of the motor vehicle, each coil connected to the alarm circuit to produce a magnetic field of equal value and of opposite polarity, the remaining terminals of both said relay coils connected to the battery return circuit through a common resistor and grounded vehicle frame connections, a self-opening push-button switch connected in electrical parallel with said resistor, one pair of relay switch contacts operated by said alarm relay armature to a closed position when an electrical current flows through said relay coil and resistor, a second pair of relay switch contacts in normally closed position operated by said relay armature to an open position when the said push-button switch is temporarily closed to by-pass the said resistor and hold the said second pair of relay switch contacts in their open position after the push-button switch is self-opened, due to an increased magnetic attraction of relay core and armature upon physical contact with each other, an alarm sounding buzzer and a warning lamp in electrical series with each other connected to the motor vehicle electrical battery through an additional electrical alarm circuit containing both said pairs of relay switch contacts connected in electrical series with said alarm buzzer, warning lamp and electrical battery, a further electrical circuit composed of a light-operated photovoltaic cell controlling an electrical relay with a pair of normally closed relay switch contacts connected in electrical series connection between the motor vehicle ignition switch and the ignition switch controlled closing coil of said alarm relay, to open the electrical circuit to said alarm relay closing coil whenever daylight generates sufficient electrical voltage in said photovoltaic cell to operate said light controlled relay and prevent the said alarm buzzer and warning lamp from operating when the motor vehicle is driven during daylight hours without its headlights burning.

6. An alarm system for motor vehicles having an electrically operated audible alarm and warning lamp connected to the motor vehicle electrical battery through two pairs of relay switch contacts, one pair of said relay switch contacts normally held in their open position, the other pair of said relay switch contacts normally held in their closed position and connected in electrical series with the first said pair of contacts, both said pair of alarm relay switch contacts operated by an alarm relay armature and a core having a pair of relay closing coils so wound and connected together that an electrical current from the motor vehicle electrical battery flowing through both of said coils will produce magnetic fields of equal value and of opposite polarity to one another, one of said relay coils connected to the vehicle battery through the vehicle ignition switch, the other said alarm relay coil connected to said battery through the vehicle headlight switch, the remaining terminal of each said relay coil connected through a resistor to the grounded frame and grounded battery return connections, a temporarily closing push-button switch connected in electrical parallel with the said resistor in the alarm relay coils return circuit to the said battery, the said resistor being of sufficient value of electrical resistance that an electrical current flowing from said battery through either one of the said alarm relay coils and through the said resistor will cause the normally open relay switch contacts to close and complete the audible alarm and lamp circuit to give the alarm, the said push-button switch, when operated manually, by-passes the resistor electrically permitting an increased amount of current to flow through the said alarm relay coil and, due to an increased magnetic attraction causes said alarm relay armature to open the normally closed second said pair of relay switch contacts, shutting off the alarm and causing said relay armature to make physical contact with said relay core and retaining this said physical contact after said push-button switch is released, due to an electrical current flowing again through the said relay closing coil and said resistor and holding said second pair of said relay switch contacts in their open position thereby rendering the alarm inoperative until the vehicle ignition switch or headlight switch is again opened or closed manually, the entire alarm system being connected to the motor vehicle electrical system to sound an alarm and light a warning lamp whenever either one, but not both, the ignition switch or the headlight switch is in the closed position, to prevent the vehicle from being driven at night without its headlights being turned on and to prevent the vehicle from benig left in a parked condition with the motor turned off and the headlights left burning, a further electrical circuit composed of a light-operated photo-voltaic cell controlling an electrical relay with a pair of normally closed relay switch contacts connected in electrical series connection between the motor vehicle ignition switch and the ignition switch controlled closing coil of said alarm relay, to open the electrical circuit to said alarm relay closing coil whenever daylight generates sufficient electrical voltage in said photo-voltaic cell to operate said light controlled relay and prevent the said audible alarm and warning lamp from operating when the motor vehicle is driven during daylight hours without its headlights burning.

7. An alarm system for motor vehicles composed of an electrically operated alarm bell and warning lamp so connected to the electrical system of the motor vehicle that it will sound an audible alarm and light a warning lamp whenever the motor of the vehicle is operated without the headlights being turned on, one pair of normally open relay switch contacts and one pair of normally closed relay switch contacts connected in electrical series connection with the said alarm bell and warning lamp and the electrical battery circuit of the vehicle, an alarm relay with an operating armature and two closing coils, one of said relay closing coils being connected to the said battery through the ignition switch of the motor vehicle and energized whenever the said ignition switch is in a closed position, the other said relay closing coil connected to the battery through the vehicle headlight switch and energized when the headlight switch is in a closed position, both said relay closing coils connected to the said battery return circuit through a resistor and suitable battery connections, a self-opening push-button switch connected in electrical parallel with the said resistor, to by-pass the said resistor when desired to shut-off the alarm system without operating the said ignition or headlight switches, each of said alarm relay closing coils when energized, producing an electromagnetic field of equal value and opposite polarity to one another and when energized separately with an electrical current flowing through said relay closing coil and resistor, operates to close the pair of said normally open relay switch contacts to sound the alarm and light the warning lamp, and when said relay closing coils are energized separately with the said push-button switch closed temporarily to by-pass the resistor and permit a larger electrical current to flow through the said relay switch contacts and hold said second pair of switch contacts open after the self-opening of said push-button switch to shut off the alarm bell and warning lamp when desired without manually operating either of said ignition and headlight switches, a further electrical circuit composed of a light operated photo-voltaic cell controlling an electrical relay with a pair of normally closed relay switch contacts connected in electrical series connection between the motor vehicle ignition switch and the ignition switch controlled closing coil of said alarm relay, to open the electrical circuit to said alarm relay closing coil whenever daylight generates sufficient electrical voltage in said photo-voltaic cell to operate said light controlled relay and prevent the said audible alarm and warning lamp from operating when the motor vehicle is driven during daylight hours without its headlights burning.

8. An alarm system for motor vehicles comprising an electrically operated audio alarm and a visual warning lamp, means for connecting this alarm system to the electrical battery circuit of the motor vehicle through two pairs of relay switch contacts, the first of said pairs of relay switch contacts normally being held in an open position, the second of said pair of relay switch contacts being normally held in a closed position, a pair of alarm relay closing coils wound upon a relay core to produce, when energized, two magnetic fields of equal strength and of opposite polarity, a relay armature controlled by said relay coils and core that operates the said two pairs of relay switch contacts, one of said pair of relay closing coils connected to the said electrical battery through the ignition switch of the motor vehicle, the second of said pair of relay closing coils connected to said battery through the motor vehicle headlight switch, the other end of both said relay closing coils connected together and also connected to the return circuit of said battery through a resistor and suitable grounded connections to the vehicle frame, a self-opening push-button switch which, when in a momentarily closed position, by-passes electrical current around the said resistor and allows a larger current to flow through the said relay closing coils producing a stronger magnetic field in said relay closing coils, either of said relay closing coils when properly energized through either of appropriate said ignition or headlight switch operating, when electrical current flows through the said coil and said resistor, to close and hold closed the said pair of normally open relay switch contacts of the audio alarm and visual warning lamp to prevent the motor vehicle driver from driving the said vehicle at night without its headlights turned on, and to further prevent the driver from leaving the vehicle in a parked condition with its motor turned off and its headlights left on, said relay closing coils to operate, when the said push-button switch is held momentarily in its closed position, to open and hold open the second said pair of relay switch contacts to effectively shut off the said audio alarm and visual warning lamp when the vehicle driver desires to operate the vehicle without the headlights being turned on or to leave the vehicle in a parked condition with the headlights left burning and the motor shut off, said relay closing coils to further operate, whenever both the said vehicle headlights and ignition switches are in a closed condition, to neutralize the magnetic attraction of said relay core and allow both of said pair of relay switch contacts to return to their normal positions, thus effectively shutting-off the entire alarm system when operating conditions are again normal, a further electrical circuit composed of a light operated photo-voltaic cell controlling an electrical relay with a pair of normally closed relay switch contacts connected in electrical series connection between the motor vehicle ignition switch and the ignition switch controlled closing coil of said alarm relay, to open the electrical circuit to said alarm relay closing coil whenever daylight generates sufficient electrical voltage in said photo-voltaic cell to operate said light controlled relay and prevent the said audible alarm and warning lamp from operating when the motor vehicle is driven during daylight hours without its headlights burning.

References Cited in the file of this patent
UNITED STATES PATENTS 2,759,176 Kennedy _____ Aug. 14, 1956